(12) United States Patent
Lin

(10) Patent No.: US 11,451,080 B2
(45) Date of Patent: Sep. 20, 2022

(54) UNIVERSAL CHARGING DEVICE AND UNIVERSAL CHARGING METHOD THEREOF

(71) Applicant: SUZHOU MEAN WELL TECHNOLOGY CO., LTD., Jiang-Su (CN)

(72) Inventor: Kwo-Tong Lin, Jiang-Su (CN)

(73) Assignee: Suzhou Mean Well Technology Co., Ltd., Jiang Su (CN)

( * ) Notice: Subject to any disclaimer, the term of this patent is extended or adjusted under 35 U.S.C. 154(b) by 246 days.

(21) Appl. No.: 17/014,301

(22) Filed: Sep. 8, 2020

(65) Prior Publication Data

US 2022/0045537 A1    Feb. 10, 2022

(30) Foreign Application Priority Data

Aug. 6, 2020    (CN) .......................... 202010780425.4

(51) Int. Cl.
*H02J 7/00*      (2006.01)
*H01M 10/0525*   (2010.01)
*H01M 10/46*     (2006.01)

(52) U.S. Cl.
CPC ... *H02J 7/007182* (2020.01); *H01M 10/0525* (2013.01); *H01M 10/46* (2013.01); *H02J 7/00714* (2020.01); *H02J 2207/40* (2020.01)

(58) Field of Classification Search
USPC ................................. 320/107, 137, 141, 164
See application file for complete search history.

(56) References Cited

U.S. PATENT DOCUMENTS

| 5,747,969 A * | 5/1998 | Tamai ................... H02J 7/00711 |
| | | 320/141 |
| 6,456,511 B1 * | 9/2002 | Wong ...................... H02M 1/36 |
| | | 363/21.13 |
| 6,516,227 B1 * | 2/2003 | Meadows .......... A61N 1/37247 |
| | | 607/46 |
| 10,574,079 B1 | 2/2020 | Berkowitz et al. |

(Continued)

FOREIGN PATENT DOCUMENTS

EP    1225674 A1 *    7/2002    .............. H02J 7/045

OTHER PUBLICATIONS

Patent Search Document Issued by a Foreign Patent Office in Document No. 20217937.0-1202 dated Jun. 29, 2021.

*Primary Examiner* — Brian Ngo
(74) *Attorney, Agent, or Firm* — Rosenberg, Klein & Lee

(57) ABSTRACT

A universal charging device and a universal charging method thereof is disclosed. An AC voltage is converted into a DC charging voltage. At least two first charging processes are sequentially performed. In each first charging process, the DC charging voltage is adjusted to be larger than the terminal voltage of a battery based on the terminal voltage and the DC charging voltage charges the battery. The DC charging voltage generates a DC charging current and a pulse current to flow through the battery until the terminal voltage is equal to the DC charging voltage. A voltage across the battery established by the pulse current satisfies a charged condition. When the terminal voltage is equal to the DC charging voltage, the DC charging current is converted into a decreasing trickle current until the value of the trickle current is decreased to a triggered current value.

38 Claims, 7 Drawing Sheets

(56) References Cited

U.S. PATENT DOCUMENTS

| | | |
|---|---|---|
| 2009/0091298 A1 | 4/2009 | Bourilkov et al. |
| 2009/0309547 A1* | 12/2009 | Nakatsuji ............ H01M 10/441 320/164 |
| 2013/0214606 A1* | 8/2013 | Hasebe .................... H02J 4/00 307/80 |
| 2014/0184173 A1* | 7/2014 | Szepesi ................ H02J 7/0068 320/164 |
| 2014/0203762 A1* | 7/2014 | Kato .................... H02J 7/0072 320/107 |
| 2014/0266068 A1 | 9/2014 | O'Brien et al. |
| 2019/0356153 A1* | 11/2019 | Wan .................... H02J 7/00041 |

* cited by examiner

| the power control detector detects the terminal voltage. The power control detector controls the charger to adjust the DC charging voltage to be larger than the terminal voltage based on the terminal voltage. The power control detector controls the charger to generate at least one pulse voltage in response to the DC charging voltage. The charger cooperates with the DC charging voltage to charge the battery. The charger respectively generates the DC charging current and at least one pulse current based on the DC charging voltage and the pulse voltage. The charger transmits the DC charging current and the pulse current to the power control detector through the battery | ∼S16 |

| the pulse current establishes a second detected voltage across the battery. When the power control detector determines the second detected voltage satisfies a full condition, the power control detector controls charger to stop generating the DC charging voltage, the pulse voltage, the DC charging current, and the pulse current | ∼S18 |

Fig. 6

UNIVERSAL CHARGING DEVICE AND UNIVERSAL CHARGING METHOD THEREOF

This application claims priority for Chinese patent application no. 202010780425.4 filed on 6 Aug. 2020, the content of which is incorporated by reference in its entirely.

BACKGROUND OF THE INVENTION

Field of the Invention

The present invention relates to the charging technology, particularly to a universal charging device and a universal charging method thereof.

Description of the Related Art

Unlike lithium batteries for one-time use, lithium-ion batteries are rechargeable batteries that can work by moving lithium ions between positive and negative electrodes. At present, lithium-ion batteries have been widely used in the field of consumer electronics, especially portable electronic products, including mobile phones, smart phones, unicycles, etc. Users can repeatedly charge lithium-ion batteries to supply power to portable electronic products. The advantages of lithium-ion batteries include high energy density, which have 250-530 watt-hours per liter
(Wh/L) in a unit volume, and high open-circuit voltage and large output power, allowing lithium-ion batteries to be widely used in different electronic products.

At present, lithium-ion batteries are widely used in our lives. Many devices use rechargeable lithium-ion batteries as the charging structure.

However, there is no universal wide-range charging device for consumers to choose from. Lithium-ion batteries introduced by various manufacturers do not have uniform voltage specifications but have their own charging devices. Therefore, consumers must purchase corresponding charging devices to charge lithium-ion batteries. If you use the wrong charging device, you may not be able to charging the battery, or causing damage to the battery. In severe cases, it will cause the battery to explode and cause industrial safety problems. In addition, every time you must repurchase charging device for a different battery, so that the life of the charging device is actually the same as that of the battery.

The behavior wastes the cost and resources. Even if the charging device is not damaged, it can no longer be used.

To overcome the abovementioned problems, the present invention provides a universal charging device and a universal charging method thereof, so as to solve the aforementioned problems of the prior art.

SUMMARY OF THE INVENTION

One objective of the present invention is to provide a universal charging device and a universal charging method thereof, which charge various batteries without knowing the rated voltages of the batteries. This way, users can use one charging device to charge various batteries, avoid using the wrong charging device to charge the battery and cause damage to batteries, reduce the probability of endangering work safety, and save costs. When replacing the battery, the user does not need to replace the charging device to avoid unnecessary waste.

In an embodiment of the present invention, a universal charging device includes a charger and a power control detector. The charger is coupled to at least one battery and configured to receive an alternating-current (AC) voltage and convert the AC voltage into a direct-current (DC) charging voltage. The at least one battery has a terminal voltage less than a rated voltage of the at least one battery. The power control detector is coupled to the at least one battery and the charger. After the charger and the power control detector determines that the at least one battery is a battery to be charged, the charger and the power control detector sequentially perform at least two first charging processes. In each of the at least two first charging processes, the power control detector detects the terminal voltage, controls the charger to adjust the DC charging voltage to be larger than the terminal voltage based on the terminal voltage, and controls the charger to generate at least one pulse voltage based on the DC charging voltage. The charger cooperates with the DC charging voltage to charge the at least one battery and respectively generates a direct-current (DC) charging current and at least one pulse current based on the DC charging voltage and the at least one pulse voltage. The charger transmits the DC charging current and the at least one pulse current to the power control detector through the at least one battery until the power control detector determines that the terminal voltage is equal to the DC charging voltage based on the DC charging current. The at least one pulse current flows through the at least one battery to establish a first detected voltage across the at least one battery. When the power control detector determines that the first detected voltage satisfies a charged condition and the terminal voltage is equal to the DC charging voltage. The power control detector controls the charger to convert the DC charging current into a decreasing trickle current until the value of the trickle current is decreased to a triggered current value. The triggered current value divided by the value of the corresponding DC charging current is equal to a fixed ratio less than 1 and larger than 0.

In an embodiment of the present invention, the at least one pulse current has a pulse period, an initial time point, and a final time point. The at least one pulse current establishes a first open-circuit voltage across the at least one battery at the initial time point. The at least one pulse current establishes a second open-circuit voltage across the at least one battery at the final time point. The charged condition defines that an absolute value of a difference between the first open-circuit voltage and the second open-circuit voltage divided by the pulse period is equal to or less than a given positive value.

In an embodiment of the present invention, the DC charging current establishes a first battery voltage across the at least one battery. The at least one pulse current establishes a second battery voltage across the at least one battery. The charged condition defines that the absolute value of a difference between the first battery voltage and the second battery voltage divided by the absolute value of a difference between the DC charging current and the at least one pulse current is equal to or less than a given positive value.

In an embodiment of the present invention, after the charger and the power control detector perform the at least two first charging processes, the charger and the power control detector perform a second charging process. In the second charging process, the power control detector detects the terminal voltage, controls the charger to adjust the DC charging voltage to be larger than the terminal voltage based on the terminal voltage, and controls the charger to generate the at least one pulse voltage in response to the DC charging voltage. The charger cooperates with the DC charging voltage to charge the at least one battery, respectively generates the DC charging current and the at least one pulse current based on the DC charging voltage and the at least one pulse voltage, and transmits the DC charging current and the at least one pulse current to the power control detector through the at least one battery. The at least one pulse current establishes a second detected voltage across the at least one battery. When the power control detector determines the second detected voltage satisfies a full condition, the power control detector controls the charger to stop generating the DC charging voltage, the at least one pulse voltage, the DC charging current, and the at least one pulse current.

In an embodiment of the present invention, the at least one pulse current has a pulse period, an initial time point, and a final time point. The at least one pulse current establishes a first open-circuit voltage across the at least one battery at the initial time point. The at least one pulse current establishes a second open-circuit voltage across the at least one battery at the final time point. The full condition defines that the absolute value of a difference between the first open-circuit voltage and the second open-circuit voltage divided by the pulse period is larger than a given positive value.

In an embodiment of the present invention, the DC charging current establishes a first battery voltage across the at least one battery. The at least one pulse current establishes a second battery voltage across the at least one battery. The full condition defines that the absolute value of a difference between the first battery voltage and the second battery voltage divided by the absolute value of a difference between the DC charging current and the at least one pulse current is larger than a given positive value.

In an embodiment of the present invention, the at least one pulse current includes a plurality of pulse currents. When the power control detector determines that the second detected voltage established by each of the plurality of pulse currents satisfies the full condition, the power control detector controls the charger to stop generating the DC charging voltage.

In an embodiment of the present invention, in each of the at least two first charging processes, a period that the terminal voltage is equal to the DC charging voltage is less than a period that the DC charging voltage is larger than the terminal voltage.

In an embodiment of the present invention, the at least two first charging processes include a previous first charging process and a next first charging process. Periods corresponding to the DC charging current and the trickle current in the previous first charging process are respectively larger than periods corresponding to the DC charging current and the trickle current in the next first charging process.

In an embodiment of the present invention, the pulse period of the at least one pulse current is less than the period of the corresponding DC charging current.

In an embodiment of the present invention, the charger controls the DC charging voltage to be larger than the terminal voltage, a difference between the DC charging voltage and the corresponding terminal voltage is a given value. The given values corresponding to the at least two first charging processes are equal.

In an embodiment of the present invention, the at least two first charging processes comprise a previous first charging process and a next first charging process. When the charger adjusts the DC charging voltage to be larger than the terminal voltage, a difference between the DC charging voltage and the corresponding terminal voltage is a given value. The given value corresponding to the previous first charging process is larger than the given value corresponding to the next first charging process.

In an embodiment of the present invention, the at least two first charging processes comprise a previous first charging process and a next first charging process. Periods corresponding to the DC charging current and the trickle current in the previous first charging process are respectively less than periods corresponding to the DC charging current and the trickle current in the next first charging process.

In an embodiment of the present invention, the charger includes an input rectifier, a resonate converter, and a synchronous rectifier. The input rectifier is configured to receive the AC voltage and convert the AC voltage into an input direct-current (DC) voltage. The resonate converter is coupled to the input rectifier and the power control detector. The resonate converter is configured to receive the input DC voltage and convert the input DC voltage into a resonate voltage. The synchronous rectifier is coupled to the resonate converter and the at least one battery.

The synchronous rectifier is configured to receive the resonate voltage and convert the resonate voltage into the DC charging voltage. The power control detector is configured to control the resonate converter and the synchronous rectifier to adjust the DC charging voltage to be larger than the terminal voltage based on the terminal voltage. The power control detector is configured to control the resonate converter and the synchronous rectifier to generate the at least one pulse voltage in response to the DC charging voltage. The resonate converter and the synchronous rectifier are configured to respectively generate the DC charging current and the at least one pulse current based on the DC charging voltage and the at least one pulse voltage. When the terminal voltage is equal to the DC charging voltage, the power control detector controls the resonate converter and the synchronous rectifier to convert the DC charging current into the trickle current.

In an embodiment of the present invention, the power control detector includes a voltage feedback circuit, a feedback resistor, a current feedback circuit, an isolator, and a controller. The voltage feedback circuit is coupled to the synchronous rectifier and the at least one battery. The voltage feedback circuit is configured to receive the terminal voltage and a voltage across the at least one battery established by the at least one pulse current, and respectively generate a first feedback voltage and at least one pulse feedback voltage based on the terminal voltage and a voltage across the at least one battery established by the at least one pulse current. The feedback resistor is connected between the synchronous rectifier and the at least one battery in series. The DC charging current, the trickle current, and the at least one pulse current flow through the feedback resistor, so as to generate a first responsive voltage, a trickle voltage, and at least one second responsive voltage across the feedback resistor. The current feedback circuit is coupled to two ends of the feedback resistor, the synchronous rectifier, and the at least one battery. The current feedback circuit is configured to receive the first responsive voltage, the trickle voltage, and the at least one second responsive voltage and respectively generate a second feedback voltage, a trickle feedback voltage, and at least one pulse responsive voltage based on the first responsive voltage, the trickle voltage, and the at least one second responsive voltage. The isolator has a primary side and a secondary side. The secondary side is coupled to the voltage feedback circuit and the current feedback circuit. The controller is coupled to the primary side and the resonate converter. The controller is configured to receive the first feedback voltage, the second feedback voltage, the trickle feedback voltage, the at least one pulse feedback voltage, and the at least one pulse responsive voltage through the isolator. The controller is configured to control the resonate converter and the synchronous rectifier to adjust the DC charging voltage to be larger than the terminal voltage based on the first feedback voltage. The controller is configured to control the resonate converter and the synchronous rectifier to generate the at least one pulse voltage in response to the DC charging voltage. The controller is configured to obtain the DC charging current according to the second feedback voltage. The controller is configured to obtain the DC charging voltage according to the DC charging current. The controller is configured to obtain the at least one pulse current according to the at least one pulse responsive voltage. The controller is configured to obtain the trickle current according to the trickle feedback voltage. The controller is configured to determine that the at least one pulse feedback voltage satisfies the charged condition. When the terminal voltage is equal to the DC charging voltage, the controller controls the resonate converter and the synchronous rectifier to convert the DC charging current into the trickle current until the value of the trickle current is decreased to the triggered current value.

In an embodiment of the present invention, the fixed ratio is 90% or 85%.

In an embodiment of the present invention, the initial value of the terminal voltage divided by the rated voltage is less than or equal to 97%.

In an embodiment of the present invention, the at least one battery is a lithium-ion battery.

In an embodiment of the present invention, the lithium-ion battery is a nickel-cobalt-lithium battery, a nickel-lithium battery, or a LiFePO$_4$ battery.

In an embodiment of the present invention, the rated voltage has a range of 9-72 volts.

In an embodiment of the present invention, the at least one battery comprises 10-20 batteries connected in series.

In an embodiment of the present invention, before the charger and the power control detector sequentially perform the at least two first charging processes, the power control detector detects the terminal voltage and drives the charger to provide an initial voltage for the at least one battery and generate an initial current. The initial current flows through the at least one battery. The power control detector is configured to receive the initial current and determine that the at least one battery is the battery to be charged according to the initial current, the terminal voltage, and a charging voltage range.

In an embodiment of the present invention, a universal charging method charges at least one battery. The at least one battery has a terminal voltage less than a rated voltage of the at least one battery. The universal charging method includes: determining that the at least one battery is a battery to be charged; converting an alternating-current (AC) voltage into a direct-current (DC) charging voltage; and sequentially performing at least two first charging processes, wherein each of the at least two first charging processes comprising steps:

adjusting the DC charging voltage to be larger than the terminal voltage based on the terminal voltage, cooperating with the DC charging voltage to charge the at least one battery, generating at least one pulse voltage based on the DC charging voltage, respectively generating a direct-current (DC) charging current and at least one pulse current based on the DC charging voltage and the at least one pulse voltage until the terminal voltage is equal to the DC charging voltage, the DC charging current and the at least one pulse current flowing through the at least one battery, the at least one pulse current flowing through the at least one battery to establish a first detected voltage across the at least one battery, and the first detected voltage satisfying a charged condition; and when the terminal voltage is equal to the DC charging voltage, converting the DC charging current into a decreasing trickle current until a value of the trickle current is decreased to a triggered current value, and the triggered current value divided by a value of a corresponding the DC charging current is equal to a fixed ratio less than 1 and larger than 0.

In an embodiment of the present invention, the at least one pulse current has a pulse period, an initial time point, and a final time point. The at least one pulse current establishes a first open-circuit voltage across the at least one battery at the initial time point. The at least one pulse current establishes a second open-circuit voltage across the at least one battery at the final time point. The charged condition defines that the absolute value of a difference between the first open-circuit voltage and the second open-circuit voltage divided by the pulse period is equal to or less than a given positive value.

In an embodiment of the present invention, the DC charging current establishes a first battery voltage across the at least one battery. The at least one pulse current establishes a second battery voltage across the at least one battery. The charged condition defines that the absolute value of a difference between the first battery voltage and the second battery voltage divided by the absolute value of a difference between the DC charging current and the at least one pulse current is equal to or less than a given positive value.

In an embodiment of the present invention, after the step of performing the at least two first charging processes, performing a second charging process, and the second charging process comprises steps: adjusting the DC charging voltage to be larger than the terminal voltage based on the terminal voltage, cooperating with the DC charging voltage to charge the at least one battery, generating the at least one pulse voltage in response to the DC charging voltage, respectively generating the DC charging current and the at least one pulse current based on the DC charging voltage and the at least one pulse voltage, and the DC charging current and the at least one pulse current flowing through the at least one battery; and the at least one pulse current establishing a second detected voltage across the at least one battery, and when the second detected voltage satisfies a full condition, stopping generating the DC charging voltage, the at least one pulse voltage, the DC charging current, and the at least one pulse current.

In an embodiment of the present invention, the at least one pulse current has a pulse period, an initial time point, and a final time point. The at least one pulse current establishes a first open-circuit voltage across the at least one battery at the initial time point. The at least one pulse current establishes a second open-circuit voltage across the at least one battery at the final time point. The full condition defines that the absolute value of a difference between the first open-circuit voltage and the second open-circuit voltage divided by the pulse period is larger than a given positive value.

In an embodiment of the present invention, the DC charging current establishes a first battery voltage across the at least one battery. The at least one pulse current establishes a second battery voltage across the at least one battery. The full condition defines that the absolute value of a difference between the first battery voltage and the second battery voltage divided by the absolute value of a difference between the DC charging current and the at least one pulse current is larger than a given positive value.

In an embodiment of the present invention, the at least one pulse current includes a plurality of pulse currents. When the second detected voltage established by each of the plurality of pulse currents satisfies the full condition, the DC charging voltage stops being generated.

In an embodiment of the present invention, in each of the at least two first charging processes, a period that the terminal voltage is equal to the DC charging voltage is less than a period that the DC charging voltage is larger than the terminal voltage.

In an embodiment of the present invention, the at least two first charging processes include a previous first charging process and a next first charging process. Periods corresponding to the DC charging current and the trickle current in the previous first charging process are respectively larger than periods corresponding to the DC charging current and the trickle current in the next first charging process.

In an embodiment of the present invention, the pulse period of the at least one pulse current is less than the period of the corresponding DC charging current.

In an embodiment of the present invention, in the step of adjusting the DC charging voltage to be larger than the terminal voltage, a difference between the DC charging voltage and the corresponding terminal voltage is a given value. The given values corresponding to the at least two first charging processes are equal.

In an embodiment of the present invention, the at least two first charging processes include a previous first charging process and a next first charging process. In the step of adjusting the DC charging voltage to be larger than the terminal voltage, a difference between the DC charging voltage and the corresponding terminal voltage is a given value. The given value corresponding to the previous first charging process is larger than the given value corresponding to the next first charging process.

In an embodiment of the present invention, the at least two first charging processes include a previous first charging process and a next first charging process. Periods of the DC charging current and the trickle current corresponding to the previous first charging process are respectively less than periods of the DC charging current and the trickle current corresponding to the next first charging process.

In an embodiment of the present invention, the fixed ratio is 90% or 85%.

In an embodiment of the present invention, the initial value of the terminal voltage divided by the rated voltage is less than or equal to 97%.

In an embodiment of the present invention, in the step of determining that the at least one battery is the battery to be charged, the terminal voltage is detected, an initial voltage is provided to the at least one battery to generate an initial current that flows through the at least one battery, and the at least one battery is determined as the battery to be charged according to the initial current, the terminal voltage, and a charging voltage range.

Below, the embodiments are described in detail in cooperation with the drawings to make easily understood the technical contents, characteristics and accomplishments of the present invention.

BRIEF DESCRIPTION OF THE DRAWINGS

FIG. 6 is a flowchart of a second charging process according to an embodiment of the present invention.

DETAILED DESCRIPTION OF THE INVENTION

Figure 1:
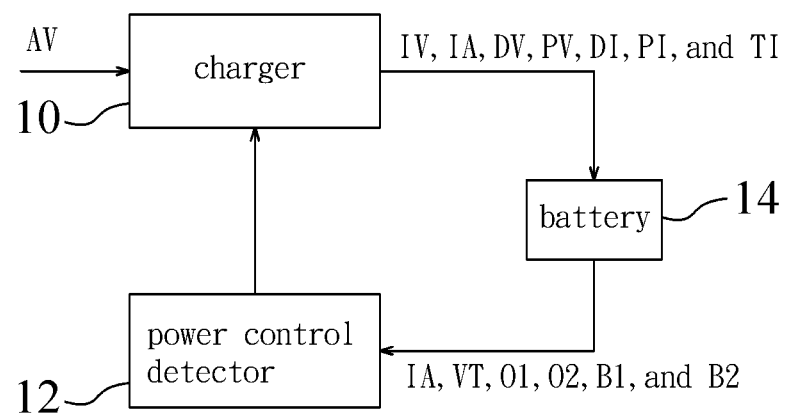
FIG. 1 is a diagram schematically illustrating a universal charging device according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Figure 2:
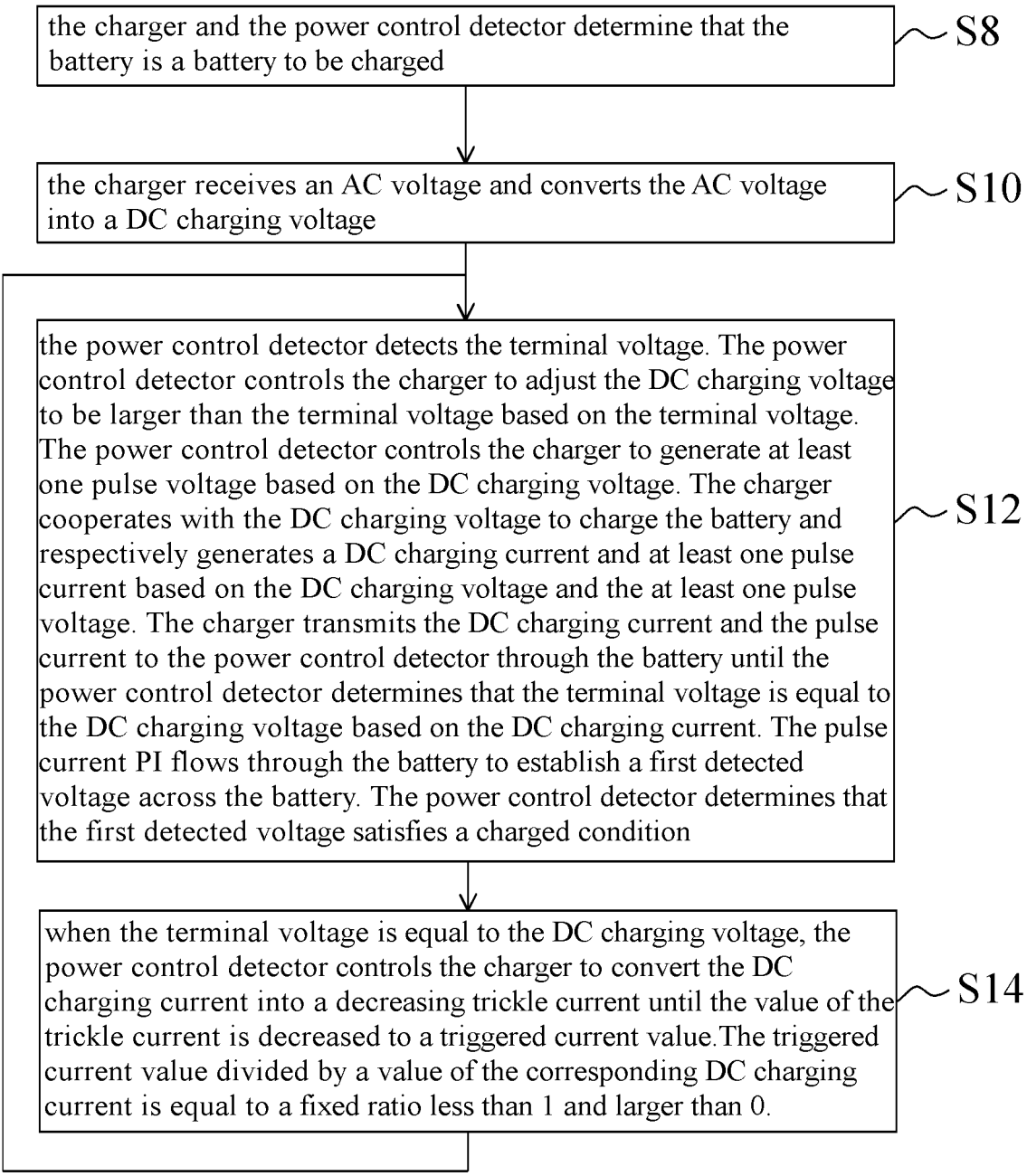
FIG. 2 is a flowchart of a universal charging method according to an embodiment of the present invention.
Figure 3:
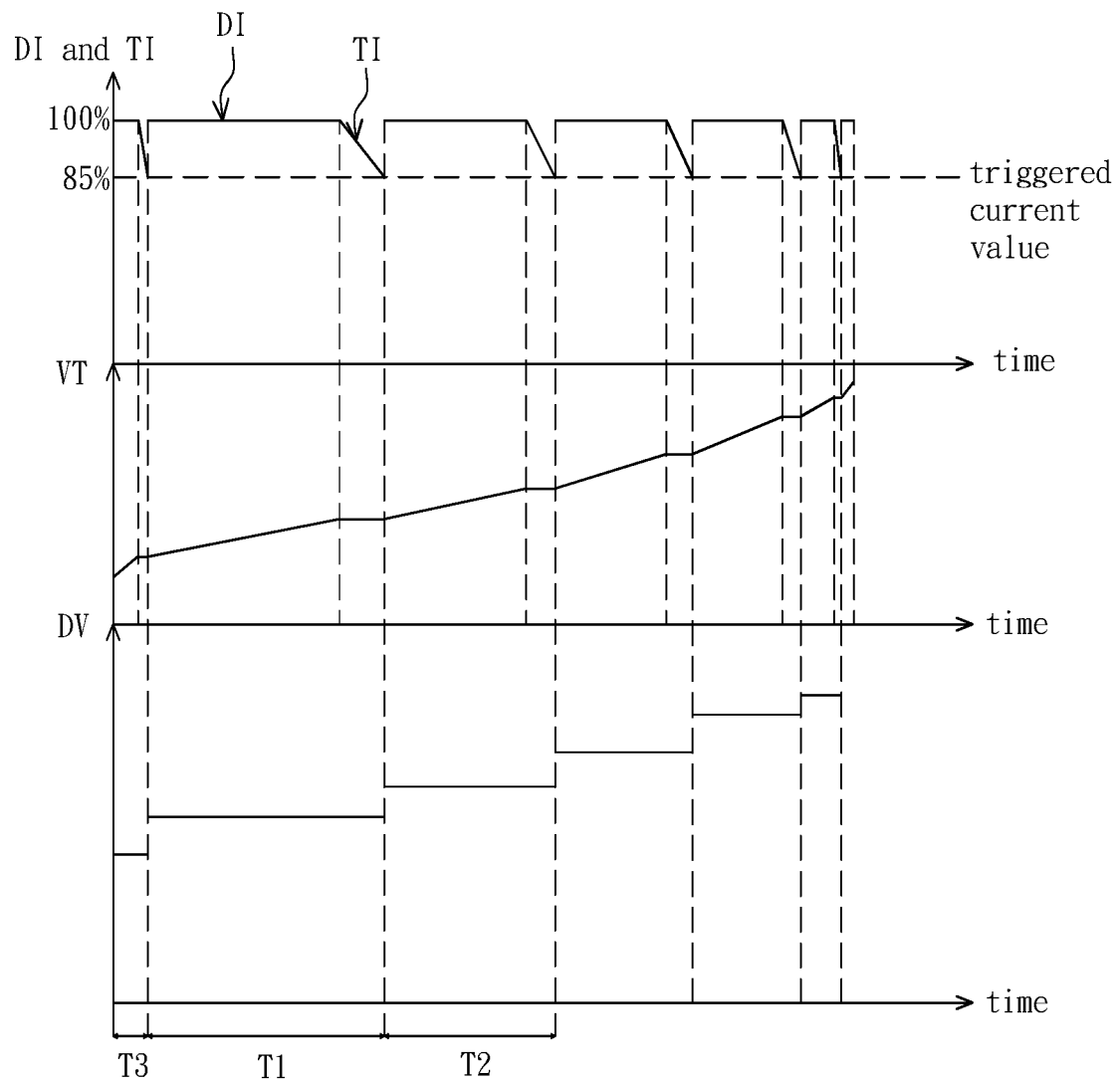
FIG. 3 is a diagram schematically illustrating waveforms of a terminal voltage of a battery, a DC charging voltage, a DC charging current, and a trickle current according to an embodiment of the present invention.
Figure 4:
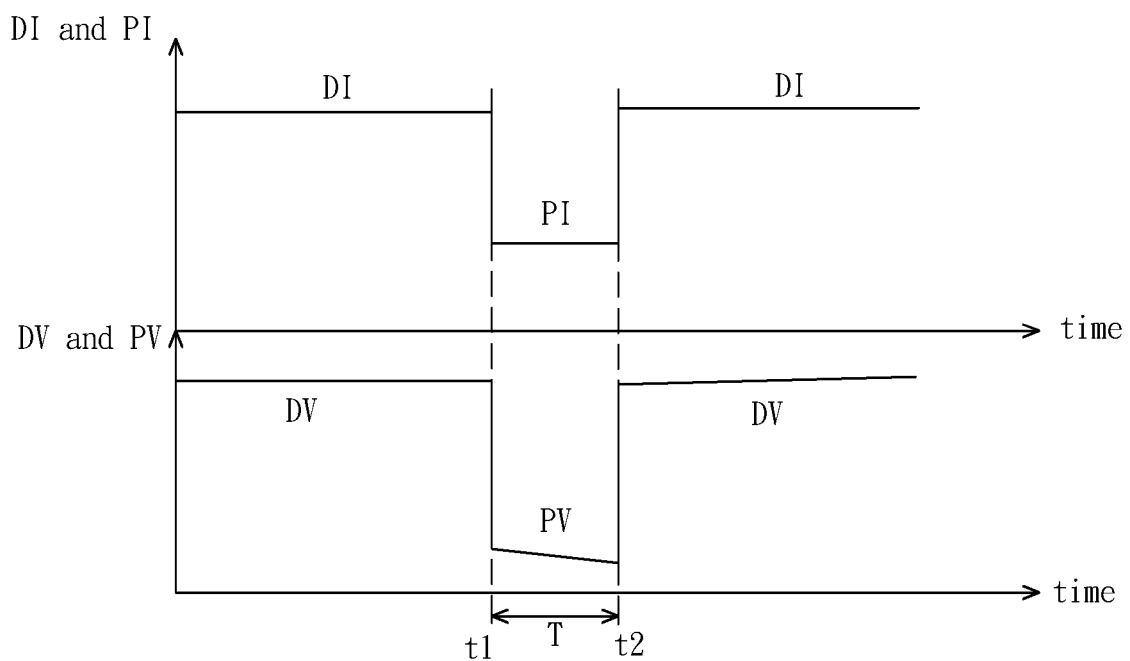
FIG. 4 is a diagram schematically illustrating waveforms of a negative pulse voltage and a negative pulse current according to an embodiment of the present invention.
Figure 5:
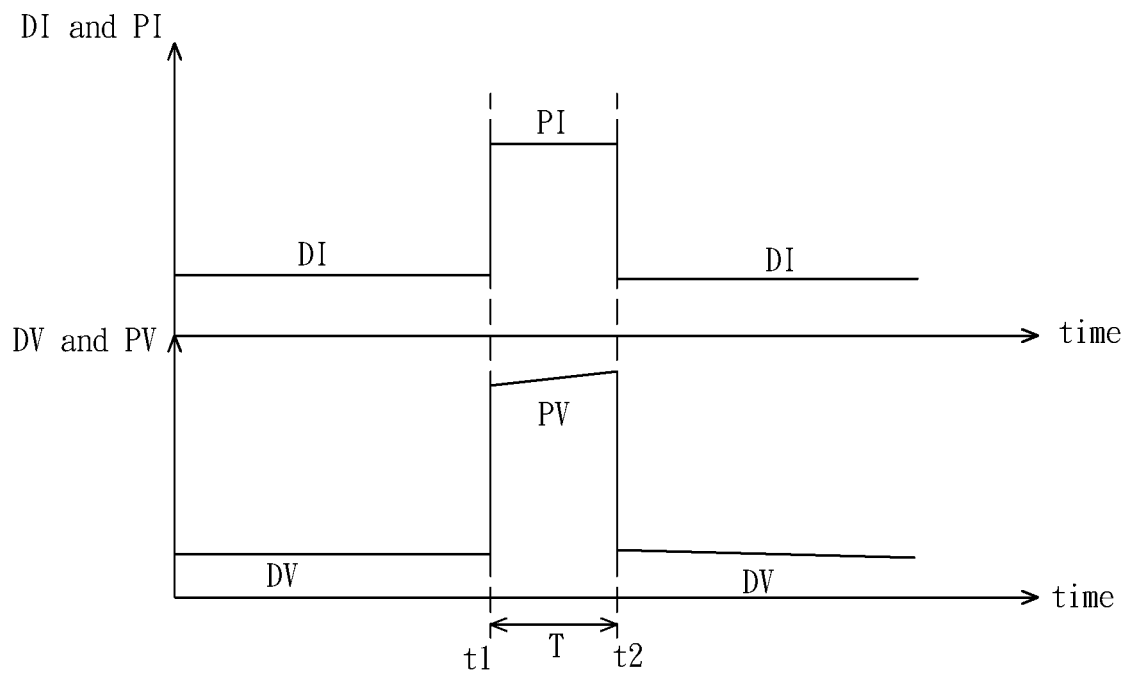
FIG. 5 is a diagram schematically illustrating waveforms of a positive pulse voltage and a positive pulse current according to an embodiment of the present invention.
Figure 7:
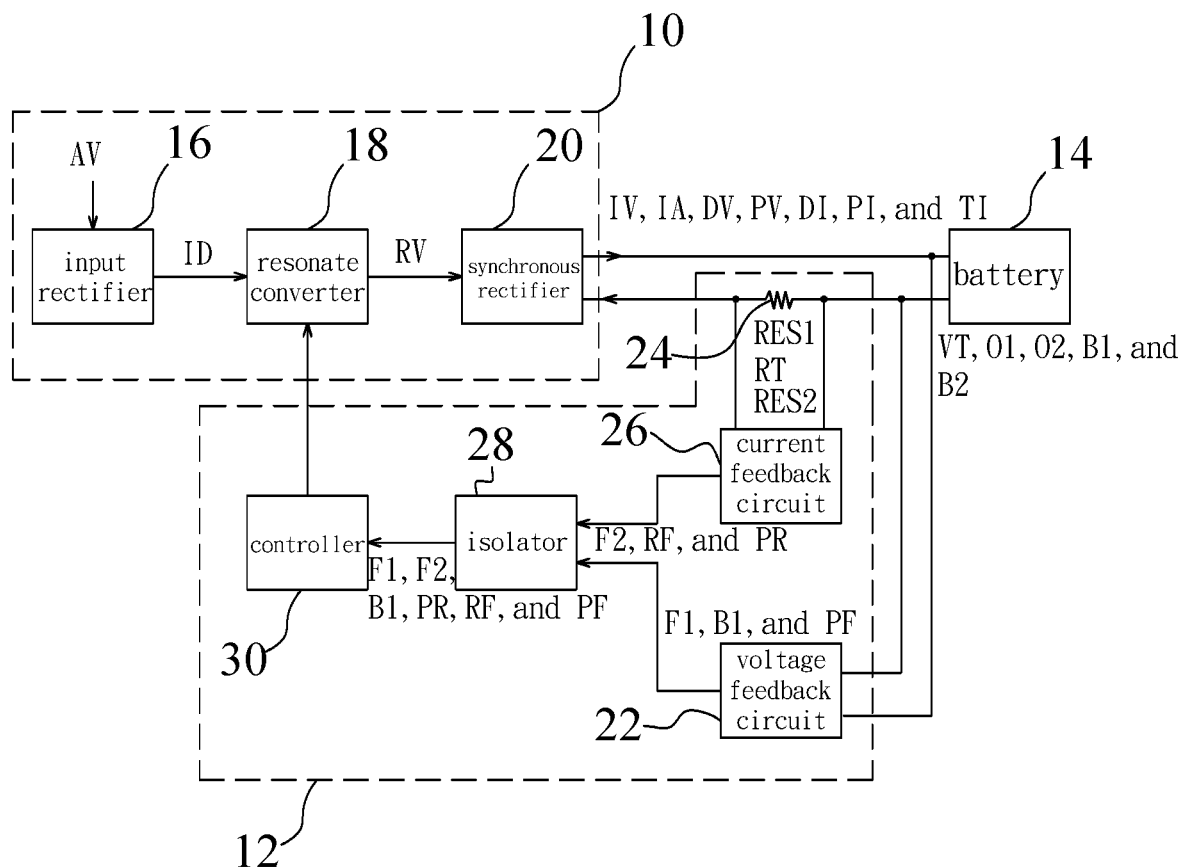
FIG. 7 is a diagram schematically illustrating a charger and a power control detector according to an embodiment of the present invention.

Referring to FIG. 1 and FIG. 2, an embodiment of the universal charging device of the present invention is introduced as follows. The universal charging device includes a charger 10 and a power control detector 12. The charger 10 is coupled to at least one battery 14. The battery 14 may be a lithium-ion battery, such as a nickel-cobalt-lithium battery, a nickel-lithium battery, or a LiFePO$_4$ battery, but the present invention is not limited thereto. The rated voltage of the battery 14 is not limited. The rated voltage of the battery 14 may be 9-72 volts. The present invention also uses 10-20 batteries 14 connected in series. In an embodiment of the present invention, one battery 14 is used. Lithium-ion batteries can be used in many consumer electronics, especially the application of portable electronics. The portable electronics include electric bicycles, unicycles, two-wheeled balanced bikes, skateboard balanced bikes, electric motorcycles, electric carts, electric patrol cars, electric golf carts, hand-held electric drills, electric wrenches, electric hammers, movable electric lawn mowers, grinders, high-pressure cleaners, remote control helicopters, remote control model cars, aerial cameras, remote control boats, handling robots, warehousing logistics handling trucks, forklifts, etc. The battery 14 has a terminal voltage VT. The terminal voltage VT is less than the rated voltage of the battery 14. Preferably but not limitedly, the initial value of the terminal voltage VT divided by the rated voltage is less than or equal to 97%. In Step S8, the charger 10 and the power control detector 12 determines that the battery 14 is a battery to be charged. In some embodiments of the present invention, the charger 10 receives an alternating-current (AC) voltage AV. The power control detector 12 may detect the terminal voltage VT and drive the charger 10 to provide an initial voltage IV for the battery 14 in response to the AC voltage AV, thereby generating an initial current IA. The initial current IA flows through the battery 14. The power control detector 12 receives the initial current IA and determines that the battery 14 is a battery to be charged according to the initial current IA, the terminal voltage VT, and a charging voltage range. For example, when the terminal voltage VT is higher than or lower than the charging voltage range, the power control detector 12 determines that the battery 14 is not a battery to be charged, such that the subsequent charging processes cannot be performed. When the terminal voltage VT is within the charging voltage range and the value of the initial current IA is less than a given current value, the power control detector 12 also determines that the battery 14 is not a battery to be charged, such that the subsequent charging processes cannot be performed. When the terminal voltage VT is within the charging voltage range and the value of the initial current IA is higher than or equal to a given current value, the power control detector 12 also determines that the battery 14 is a battery to be charged, such that the subsequent charging processes can be performed.

In Step S10, the charger 10 receives the AC voltage AV, such as mains electricity. The charger 10 converts the AC voltage AV into a direct-current (DC) charging voltage DV. The power control detector 12 is coupled to the battery 14 and the charger 10. The charger 10 and the power control detector 12 sequentially perform at least two first charging processes. Each first charging process includes Steps S12 and S14.

Refer to FIG. 1, FIG. 2, FIG. 3, FIG. 4, and FIG. 5. In Step S12, the power control detector 12 detects the terminal voltage VT. The power control detector 12 controls the charger 10 to adjust the DC charging voltage DV to be larger than the terminal voltage VT based on the terminal voltage VT. The power control detector 12 controls the charger 10 to generate at least one pulse voltage PV based on the DC charging voltage DV. The pulse voltage PV may be a positive pulse voltage or a negative pulse voltage. In some embodiments of the present invention, the number of the pulse voltage PV is one or more. The charger 10 cooperates with the DC charging voltage DV to charge the battery 14 and respectively generates a direct-current (DC) charging current DI and at least one pulse current PI based on the DC charging voltage DV and the at least one pulse voltage PV. The charger 10 transmits the DC charging current DI and the pulse current PI to the power control detector 12 through the battery 14 until the power control detector 12 determines that the terminal voltage VT is equal to the DC charging voltage DV based on the DC charging current DI. In some embodiments of the present invention, the number of the pulse current PI is one or more. When the pulse voltage PV is a positive pulse voltage, the pulse current PI is a positive pulse current. When the pulse voltage PV is a negative pulse voltage, the pulse current PI is a negative pulse current. The depth and the width of the pulse current PI are adaptable according to requirement. The pulse current PI cannot influence the charging processes. The pulse current PI flows through the battery 14 to establish a first detected voltage across the battery 14. The power control detector 12 determines that the first detected voltage satisfies a charged condition. In Step S14, when the terminal voltage VT is equal to the DC charging voltage DV, the power control detector 12 controls the charger 10 to convert the DC charging current DI into a decreasing trickle current TI until the value of the trickle current TI is decreased to a triggered current value. The triggered current value divided by a value of the corresponding DC charging current DI is equal to a fixed ratio less than 1 and larger than 0. The fixed ratio may be 90% or 85%. The fixed ratio is adaptable according to requirement.

The present invention performs at least two first charging processes on the battery 14 without knowing the rated voltage of the battery 14. The present invention uses the decreasing trickle current TI at least two times to avoid the overcharge phenomenon of the battery 14. The conventional charging device in the market charges a battery at a given constant voltage. Unlike the conventional charging device, the charging device of the present invention charges a battery during at least two steps. This way, users may use a single charging device to charge various batteries, avoid using the wrong charging device to charge the battery and cause damage to batteries, reduce the probability of endangering work safety, and save costs. When replacing the battery, the user does not need to replace the charging device to avoid unnecessary waste.

The present invention does not limit the charged condition. In some embodiments of the present invention, the pulse current PI has a pulse period T, an initial time point t1, and a final time point t2. The pulse current PI establishes a first open-circuit voltage O1 across the battery 14 at the initial time point t1. The pulse current PI establishes a second open-circuit voltage O2 across the battery 14 at the final time point t2. The pulse period T, the first open-circuit voltage O1, and the second open-circuit voltage O2 are transmitted to the power control detector 12. The charged condition defines that the absolute value of a difference between the first open-circuit voltage O1 and the second open-circuit voltage O2 divided by the pulse period T is equal to or less than a given positive value.

In some embodiments of the present invention, the DC charging current DI establishes a first battery voltage B1 across the battery 14. The pulse current PI establishes a second battery voltage B2 across the battery 14. The first battery voltage B1 and the second battery voltage B2 are transmitted to the power control detector 12.

The charged condition defines that the absolute value of a difference between the first battery voltage B1 and the second battery voltage B2 divided by the absolute value of a difference between the DC charging current DI and the pulse current PI is equal to or less than a given positive value. As mentioned above, the present invention can define the charged condition based on the internal resistance of the battery 14.

In some embodiments of the present invention, in each first charging process, a period that the terminal voltage VT is equal to the DC charging voltage DV is less than a period that the DC charging voltage DV is larger than the terminal voltage VT. Thus, the charging time is reduced. Preferably but not limitedly, periods corresponding to the DC charging current DI and the trickle current TI in the previous first charging process are respectively larger than periods corresponding to the DC charging current DI and the trickle current TI in the next first charging process. Thus, the total period T1 of the previous first charging process is larger than the total period T2 of the next first charging process. This is because the DC charging voltage DV will be higher and higher, so that the time of the first charging process will be shorter and shorter. It is noted that the period of the pulse current PI is very short. The period of the pulse current PI may be 30 seconds. That is to say, in the same first charging process, the pulse period T of the pulse current PI is less than the period of the corresponding DC charging current DI, but the present invention is not limited thereto. The pulse period T can allow the power control detector 12 to read the current value and the voltage value corresponding to the pulse current PI. If the pulse period T is very short, the power control detector 12 will not read the current value and the voltage value corresponding to the pulse current PI. In some embodiments of the present invention, the charger 10 controls the DC charging voltage DV to be larger than the terminal voltage VT. A difference between the DC charging voltage DV and the corresponding terminal voltage is a given value. The given values corresponding to all the first charging processes are equal.

For example, the given value may be 2 V. The charger 10 provides the DC charging voltage DV that can be 39 V. The terminal voltage VT is 37 V when the charger 10 starts to charge the battery 14. Simultaneously, the DC charging current DI is a fixed value, which is 100% of a full current. The terminal voltage VT gradually increases to 39 V. Afterwards, the trickle current TI starts to decrease. When the trickle current TI decreases to a triggered current value that can be 85% of the full current, the DC charging voltage DV is increased by 2 V. The abovementioned process is endlessly repeated until the battery 14 is full of power. Each increased voltage difference is adaptable according to requirement, such as resolution of the power control detector 12 and properties of the battery 14. The increased voltage difference may be 1 V or 3V. This experiment was conducted with a fully discharged battery 14. The times that the voltage increases depends on the rated voltage of the battery 14. The given value being the increased voltage difference may be preset in the power control detector 12. Alternatively, in some applications, the given value is inputted in a wired or wirelessly way. The power control detector 12 reads the given value being the increased voltage difference. The triggered current value is transmitted to the power control detector 12 in a wired or wirelessly way or preset in the power control detector 12.

Considering the cost, the power control detector 12 is sometimes implemented with a low-resolution control chip. Alternatively, the DC charging voltage DV is greatly larger than the terminal voltage VT, such that the feedback circuit cannot rapidly respond. In these situations, the following ways are used to adjust the given value and the total period of the first charging process. In some embodiments of the present invention, when the charger 10 adjusts the DC charging voltage DV to be larger than the terminal voltage VT, a difference between the DC charging voltage DV and the corresponding terminal voltage VT is a given value. The given value corresponding to the previous first charging process is larger than the given value corresponding to the next first charging process. In addition, periods corresponding to the DC charging current DI and the trickle current TI in the previous first charging process are respectively less than periods corresponding to the DC charging current DI and the trickle current TI in the next first charging process. As a result, the total period T3 of the previous first charging process is less than the total period T1 of the next first charging process. The speed of feedback response is insufficiently high, which is a relative concept. The concept can determine whether the hardware of the charging device has a capability to recognize the difference of voltage and current in unit time. If the charging device cannot recognize the difference of voltage and current, the speed of feedback response may be one of reasons.

Refer to FIG. 1, FIG. 2, FIG. 3, FIG. 4, FIG. 5, and FIG. 6. In some embodiments of the present invention, after performing all the first charging processes, the charger 10 and the power control detector 12 perform a second charging process. The second charging process includes Steps S16 and S18. In Step S16, the power control detector 12 detects the terminal voltage VT. The power control detector 12 controls the charger 10 to adjust the DC charging voltage DV to be larger than the terminal voltage VT based on the terminal voltage VT. The power control detector 12 controls the charger 10 to generate at least one pulse voltage PV in response to the DC charging voltage DV. The pulse voltage PV may be a positive pulse voltage or a negative pulse voltage. In some embodiments of the present invention, the number of the pulse voltage PV is one or more. The charger 10 cooperates with the DC charging voltage DV to charge the battery 14. The charger 10 respectively generates the DC charging current DI and at least one pulse current PI based on the DC charging voltage DV and the pulse voltage PV. The charger 10 transmits the DC charging current DI and the pulse current PI to the power control detector 12 through the battery 14. In some embodiments of the present invention, the number of the pulse current PI is one or more. When the pulse voltage PV is a positive pulse voltage, the pulse current PI is a positive pulse current. When the pulse voltage PV is a negative pulse voltage, the pulse current PI is a negative pulse current. The depth and the width of the pulse current PI are adaptable according to requirement. The pulse current PI cannot influence the charging processes. The pulse current PI establishes a second detected voltage across the battery 14. In Step S18, when the power control detector 12 determines the second detected voltage satisfies a full condition, the power control detector 12 controls charger 10 to stop generating the DC charging voltage DV, the pulse voltage PV, the DC charging current DI, and the pulse current PI, lest the DC charging voltage DV be endlessly increased to overcharge the battery 14.

The present invention does not limit the full condition. In some embodiments of the present invention, the pulse current PI has a pulse period T, an initial time point t1, and a final time point t2. The pulse current PI establishes a first open-circuit voltage O1 across the battery 14 at the initial time point t1. The pulse current PI establishes a second open-circuit voltage O2 across the battery 14 at the final time point t2. The pulse period T, the first open-circuit voltage O1, and the second open-circuit voltage O2 are transmitted to the power control detector 12. The full condition defines that the absolute value of a difference between the first open-circuit voltage O1 and the second open-circuit voltage O2 divided by the pulse period T is larger than a given positive value.

In some embodiments of the present invention, the DC charging current DI establishes a first battery voltage B1 across the battery 14. The pulse current PI establishes a second battery voltage B2 across the battery 14. The first battery voltage B1 and the second battery voltage B2 are transmitted to the power control detector 12. The full condition defines that the absolute value of a difference between the first battery voltage B1 and the second battery voltage B2 divided by the absolute value of a difference between the DC charging current DI and the pulse current PI is larger than a given positive value. As mentioned above, the full condition depends on the internal resistance of the battery 14.

In some embodiments of the present invention, there is a plurality of pulse currents PI. When the power control detector 12 determines that the second detected voltage established by each of the plurality of pulse currents PI satisfies the full condition, the power control detector 12 controls the charger 10 to stop generating the DC charging voltage DV. The number of the pulse currents PI satisfying the full condition is adaptable according to hardware specifications.

Refer to FIG. 1, FIG. 3, FIG. 4, FIG. 5, and FIG. 7. The circuit architecture of FIG. 7 may be applied to the embodiment of FIG. 1 or the other embodiments of the present invention, but the present invention is not limited thereto. The charger 10 may include an input rectifier 16, a resonate converter 18, and a synchronous rectifier 20. The input rectifier 16 may include an X capacitor, a Y capacitor, a bridge rectifier, and a power factor correction (PFC) circuit. The PFC circuit may be an interleave PFC circuit. The resonate converter 18 may be a topology formed by a transformer and power transistors, such as a LLC resonate converter. The synchronous rectifier 20 may be a rectifier formed by diodes. The input rectifier 16 receives the AC voltage AV and converts the AC voltage AV into an input direct-current (DC) voltage ID. The resonate converter 18 is coupled to the input rectifier 16 and the power control detector 12. The resonate converter 18 receives the input DC voltage ID and convert the input DC voltage ID into a resonate voltage RV. The synchronous rectifier 20 is coupled to the resonate converter 18 and the battery 14. The synchronous rectifier 20 receives the resonate voltage RV and convert the resonate voltage RV into the DC charging voltage DV. The power control detector 12 controls the resonate converter 18 and the synchronous rectifier 20 to adjust the DC charging voltage DV to be larger than the terminal voltage VT based on the terminal voltage VT. The power control detector 12 controls the resonate converter 18 and the synchronous rectifier 20 to generate the pulse voltage PV in response to the DC charging voltage DV. The resonate converter 18 and the synchronous rectifier 20 respectively generate the DC charging current DI and the pulse current PI based on the DC charging voltage DV and the pulse voltage PV. When the terminal voltage VT is equal to the DC charging voltage DV, the power control detector 12 controls the resonate converter 18 and the synchronous rectifier 20 to convert the DC charging current DI into the trickle current TI.

The power control detector 12 may include a voltage feedback circuit 22, a feedback resistor 24, a current feedback circuit 26, an isolator 28, and a controller 30. For example, the voltage feedback circuit 22 and the current feedback circuit 26 may be comparators. The isolator 28 may be an optical coupler. The controller 30 is configured to control the duty cycle of the power transistor of the resonate converter 18. The voltage feedback circuit 22 is coupled to the synchronous rectifier 20 and the battery 14. The voltage feedback circuit 22 receives the terminal voltage VT and a voltage across the battery 14 established by the pulse current PI. The voltage feedback circuit 22 respectively generates a first feedback voltage F1 and at least one pulse feedback voltage PF based on the terminal voltage VT and a voltage across the battery 14 established by the pulse current PI. The feedback resistor 24 is connected between the synchronous rectifier 20 and the battery 14 in series. The DC charging current DI, the trickle current TI, and the pulse current PI flow through the feedback resistor 24, so as to generate a first responsive voltage RES1, a trickle voltage RT, and at least one second responsive voltage RES2 across the feedback resistor 24. The current feedback circuit 26 is coupled to two ends of the feedback resistor 24, the synchronous rectifier 20, and the battery 14. The current feedback circuit 26 receives the first responsive voltage RES1, the trickle voltage RT, and the second responsive voltage RES2 and respectively generates a second feedback voltage F2, a trickle feedback voltage RF, and at least one pulse responsive voltage PR based on the first responsive voltage RES1, the trickle voltage RT, and the second responsive voltage RES2. The isolator has a primary side and a secondary side. The secondary side is coupled to the voltage feedback circuit 22 and the current feedback circuit 26. The controller 30 is coupled to the primary side of the isolator 28 and the resonate converter 18. The controller 30 receives the first feedback voltage F1, the second feedback voltage F2, the trickle feedback voltage RF, the pulse feedback voltage PF, and the pulse responsive voltage PR through the isolator 28. The controller 30 controls the resonate converter 18 and the synchronous rectifier 20 to adjust the DC charging voltage DV to be larger than the terminal voltage VT based on the first feedback voltage F1. The controller 30 controls the resonate converter 18 and the synchronous rectifier 20 to generate the pulse voltage PV in response to the DC charging voltage DV. The controller 30 obtains the DC charging current DI according to the second feedback voltage F2. The controller 30 obtains the DC charging voltage DV according to the DC charging current DI. The controller 30 obtains the pulse current PI according to the pulse responsive voltage PR. The controller 30 obtains the trickle current TI according to the trickle feedback voltage RF. The controller 30 determines that the pulse feedback voltage PF satisfies the charged condition. When the terminal voltage VT is equal to the DC charging voltage DV, the controller 30 controls the resonate converter 18 and the synchronous rectifier 20 to convert the DC charging current DI into the trickle current TI until the value of the trickle current TI is decreased to the triggered current value.

In some embodiments of the present invention, the pulse feedback voltage PF includes the pulse period T, the first open-circuit voltage O1, and the second open-circuit voltage O2. The controller 30 determines whether the pulse feedback voltage PF satisfies the charged condition or the full condition based on the pulse period T, the first open-circuit voltage O1, and the second open-circuit voltage O2. Alternatively, the pulse feedback voltage PF includes the second battery voltage B2. The voltage feedback circuit 22 transmits the first battery voltage B1 to the controller 30 through the isolator 28. Thus, the controller 30 determines whether the first battery voltage B1, the second battery voltage B2, the DC charging current DI, and the pulse current PI satisfy the charged condition or the full condition. The controller 30 can adjust the number of the pulse currents PI for stopping generating the DC charging voltage DV, the periods of the DC charging current and the trickle current TI, the pulse period T, and the difference between the DC charging voltage DV and the corresponding terminal voltage VT. The controller 30 may be implemented with an analog controller, a digital controller, a low-resolution control chip, or a high-resolution control chip, but the present invention is not limited thereto.

The complete operation of the universal charging device of the present invention is introduced as follows. The input rectifier 16 receives the AC voltage AV and converts the AC voltage AV into the input DC voltage ID. The voltage feedback circuit 22 receives the terminal voltage VT and generates a corresponding voltage based on the terminal voltage VT. The voltage feedback circuit 22 transmits the corresponding voltage to the controller 30 through the isolator 28. The controller 30 obtains the terminal voltage VT according to the corresponding voltage and determines that the terminal voltage VT is within the charging voltage range. The resonate converter 18 and the synchronous rectifier 20 provide an initial voltage IV for the battery 14 to generate an initial current IA. The initial current IA flows through the battery 14. The initial current IA flows through the feedback resistor 24 to establish a voltage drop across the feedback resistor 24. The current feedback circuit 26 receives the voltage drop and transmits the voltage drop to the controller 30 through the isolator 28. The controller 30 obtains the initial current IA according to the voltage drop. Because the initial current IA is larger than or equal to a given current value, the controller 30 determines that the battery 14 is a battery to be charged, such that the subsequent charging process is performed.

The input rectifier 16 receives the AC voltage AV and converts the AC voltage AV into an input DC voltage ID. Then, the resonate converter 18 receives the input DC voltage ID and convert the input DC voltage ID into the resonate voltage RV. The synchronous rectifier 20 receives the resonate voltage RV and convert the resonate voltage RV into the DC charging voltage DV. The DC charging voltage DV is applied to the battery 14 to charge the battery 14. Simultaneously, the resonate converter 18 and the synchronous rectifier 20 generate the DC charging current DI based on the DC charging voltage DV. The DC charging current DI flows through the battery 14 and the feedback resistor 24.

Then, at least two first charging processes are performed. Each first charging process includes the following steps. The voltage feedback circuit 22 receives the terminal voltage VT and generates the first feedback voltage F1 based on the terminal voltage VT. The DC charging current DI establishes the first responsive voltage RES1 across the feedback resistor 24. The current feedback circuit 26 receives the first responsive voltage RES1 and generates the second feedback voltage F2 based on the first responsive voltage RES1. The controller 30 receives the first feedback voltage F1 and the second feedback voltage F2 through the isolator 28. The controller 30 obtains the terminal voltage VT according to the first feedback voltage F1. The controller 30 obtains the DC charging current DI according to the second feedback voltage F2. The controller 30 obtains the DC charging voltage DV according to the DC charging current DI. The controller 30 controls the resonate converter 18 and the synchronous rectifier 20 to adjust the DC charging voltage DV to be larger than the terminal voltage VT based on the first feedback voltage F1. The controller 30 controls the resonate converter 18 and the synchronous rectifier 20 to generate the pulse voltage PV in response to the DC charging voltage DV. The resonate converter 18 and the synchronous rectifier 20 respectively generate the DC charging current DI and the pulse current PI based on the DC charging voltage DV and the pulse voltage PV. The voltage feedback circuit 22 receives a voltage across the battery 14 established by the pulse current PI and generates the pulse feedback voltage PF based on the voltage across the battery 14 established by the pulse current PI. Simultaneously, the pulse current PI flows through the feedback resistor 24 and establishes the second responsive voltage RES2 across the feedback resistor 24. The current feedback circuit 26 receives the second responsive voltage RES2 and generates the pulse responsive voltage PR based on the second responsive voltage RES2. The controller 30 receives the pulse feedback voltage PF and the pulse responsive voltage PR through the isolator 28. The controller 30 obtains the pulse current PI according to the pulse responsive voltage PR. The controller 30 determines that the pulse feedback voltage PF satisfies the charged condition. When the terminal voltage VT is equal to the DC charging voltage DV, the controller 30 controls the resonate converter 18 and the synchronous rectifier 20 to convert the DC charging current DI into the trickle current TI. The trickle current TI flows through the feedback resistor 24 and establishes the trickle voltage RT across the feedback resistor 24. The current feedback circuit 26 receives the trickle voltage RT and generates the trickle feedback voltage RF based on the trickle voltage RT. The controller 30 receives the trickle feedback voltage RF through the isolator 28. The controller 30 obtains the trickle current TI according to the trickle feedback voltage RF. When the controller 30 determines that the value of the trickle current TI is decreased to the triggered current value, the first charging process is finished.

After all the first charging processes, the second charging process is performed. The second charging process includes the following steps. The voltage feedback circuit 22 receives the terminal voltage VT and generates the first feedback voltage F1 based on the terminal voltage VT. The DC charging current DI establishes the first responsive voltage RES1 across the feedback resistor 24. The current feedback circuit 26 receives the first responsive voltage RES1 and generates the second feedback voltage F2 based on the first responsive voltage RES1. The controller 30 receives the first feedback voltage F1 and the second feedback voltage F2 through the isolator 28. The controller 30 obtains the terminal voltage VT according to the first feedback voltage F1. The controller 30 obtains the DC charging current DI according to the second feedback voltage F2. The controller 30 obtains the DC charging voltage DV according to the DC charging current DI. The controller 30 controls the resonate converter 18 and the synchronous rectifier 20 to adjust the DC charging voltage DV to be larger than the terminal voltage VT based on the first feedback voltage F1. The controller 30 controls the resonate converter 18 and the synchronous rectifier 20 to generate the pulse voltage PV in response to the DC charging voltage DV. The resonate converter 18 and the synchronous rectifier 20 respectively generate the DC charging current DI and the pulse current PI based on the DC charging voltage DV and the pulse voltage PV. The voltage feedback circuit 22 receives a voltage across the battery 14 established by the pulse current PI and generates the pulse feedback voltage PF based on the voltage across the battery 14 established by the pulse current PI. Simultaneously, the pulse current PI flows through the feedback resistor 24 and establishes the second responsive voltage RES2 across the feedback resistor 24. The current feedback circuit 26 receives the second responsive voltage RES2 and generates the pulse responsive voltage PR based on the second responsive voltage RES2. The controller 30 receives the pulse feedback voltage PF and the pulse responsive voltage PR through the isolator 28. The controller 30 obtains the pulse current PI according to the pulse responsive voltage PR. When the controller 30 determines that the pulse feedback voltage PF satisfies the full condition, the controller 30 controls the resonate converter 18 and the synchronous rectifier 20 to stop generating the DC charging voltage DV, the pulse voltage PV, the DC charging current DI, and the pulse current PI.

According to the embodiments provided above, the present invention can charge batteries with different rated voltages without knowing the battery capacity. This way, users only need one charging device to charge various batteries without purchasing additional matching charging devices. The present invention can saves expenditure, avoid the damage to the battery caused by using the wrong charging device, or avoid the work safety hazards such as explosion caused by overcharging the battery.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A universal charging device comprising:
    a charger coupled to at least one battery and configured to receive an alternating-current (AC) voltage and convert the AC voltage into a direct-current (DC) charging voltage, wherein the at least one battery has a terminal voltage less than a rated voltage of the at least one battery; and
    a power control detector coupled to the at least one battery and the charger, wherein after the charger and the power control detector determines that the at least one battery is a battery to be charged, the charger and the power control detector sequentially perform at least two first charging processes;
    wherein in each of the at least two first charging processes, the power control detector detects the terminal voltage, controls the charger to adjust the DC charging voltage to be larger than the terminal voltage based on the terminal voltage, and controls the charger to generate at least one pulse voltage based on the DC charging voltage, the charger cooperates with the DC charging voltage to charge the at least one battery and respectively generates a direct-current (DC) charging current and at least one pulse current based on the DC charging voltage and the at least one pulse voltage, the charger transmits the DC charging current and the at least one pulse current to the power control detector through the at least one battery until the power control detector determines that the terminal voltage is equal to the DC charging voltage based on the DC charging current, the at least one pulse current flows through the at least one battery to establish a first detected voltage across the at least one battery, when the power control detector determines that the first detected voltage satisfies a charged condition and the terminal voltage is equal to the DC charging voltage, the power control detector controls the charger to convert the DC charging current into a decreasing trickle current until a value of the trickle current is decreased to a triggered current value, and the triggered current value divided by a value of a corresponding the DC charging current is equal to a fixed ratio less than 1 and larger than 0.

2. The universal charging device according to claim 1, wherein the at least one pulse current has a pulse period, an initial time point, and a final time point, the at least one pulse current establishes a first open-circuit voltage across the at least one battery at the initial time point, the at least one pulse current establishes a second open-circuit voltage across the at least one battery at the final time point, and the charged condition defines that an absolute value of a difference between the first open-circuit voltage and the second open-circuit voltage divided by the pulse period is equal to or less than a given positive value.

3. The universal charging device according to claim 1, wherein the DC charging current establishes a first battery voltage across the at least one battery, the at least one pulse current establishes a second battery voltage across the at least one battery, and the charged condition defines that an absolute value of a difference between the first battery voltage and the second battery voltage divided by an absolute value of a difference between the DC charging current and the at least one pulse current is equal to or less than a given positive value.

4. The universal charging device according to claim 1, wherein after the charger and the power control detector perform the at least two first charging processes, the charger and the power control detector perform a second charging process, and wherein in the second charging process, the power control detector detects the terminal voltage, controls the charger to adjust the DC charging voltage to be larger than the terminal voltage based on the terminal voltage, and controls the charger to generate the at least one pulse voltage in response to the DC charging voltage, the charger cooperates with the DC charging voltage to charge the at least one battery, respectively generates the DC charging current and the at least one pulse current based on the DC charging voltage and the at least one pulse voltage, and transmits the DC charging current and the at least one pulse current to the power control detector through the at least one battery, the at least one pulse current establishes a second detected voltage across the at least one battery, and when the power control detector determines the second detected voltage satisfies a full condition, the power control detector controls the charger to stop generating the DC charging voltage, the at least one pulse voltage, the DC charging current, and the at least one pulse current.

5. The universal charging device according to claim 4, wherein the at least one pulse current has a pulse period, an initial time point, and a final time point, the at least one pulse current establishes a first open-circuit voltage across the at least one battery at the initial time point, the at least one pulse current establishes a second open-circuit voltage across the at least one battery at the final time point, and the full condition defines that an absolute value of a difference between the first open-circuit voltage and the second open-circuit voltage divided by the pulse period is larger than a given positive value.

6. The universal charging device according to claim 4, wherein the DC charging current establishes a first battery voltage across the at least one battery, the at least one pulse current establishes a second battery voltage across the at least one battery, and the full condition defines that an absolute value of a difference between the first battery voltage and the second battery voltage divided by an absolute value of a difference between the DC charging current and the at least one pulse current is larger than a given positive value.

7. The universal charging device according to claim 4, wherein the at least one pulse current comprises a plurality of pulse currents, and when the power control detector determines that the second detected voltage established by each of the plurality of pulse currents satisfies the full condition, the power control detector controls the charger to stop generating the DC charging voltage.

8. The universal charging device according to claim 1, wherein in each of the at least two first charging processes, a period that the terminal voltage is equal to the DC charging voltage is less than a period that the DC charging voltage is larger than the terminal voltage.

9. The universal charging device according to claim 1, wherein the at least two first charging processes comprise a previous first charging process and a next first charging process, and periods corresponding to the DC charging current and the trickle current in the previous first charging process are respectively larger than periods corresponding to the DC charging current and the trickle current in the next first charging process.

10. The universal charging device according to claim 1, wherein a pulse period of the at least one pulse current is less than a period of a corresponding the DC charging current.

11. The universal charging device according to claim 1, wherein the charger controls the DC charging voltage to be larger than the terminal voltage, a difference between the DC charging voltage and a corresponding the terminal voltage is a given value, and the given values corresponding to the at least two first charging processes are equal.

12. The universal charging device according to claim 1, wherein the at least two first charging processes comprise a previous first charging process and a next first charging process, when the charger adjusts the DC charging voltage to be larger than the terminal voltage, a difference between the DC charging voltage and a corresponding the terminal voltage is a given value, and the given value corresponding to the previous first charging process is larger than the given value corresponding to the next first charging process.

13. The universal charging device according to claim 1, wherein the at least two first charging processes comprise a previous first charging process and a next first charging process, and periods corresponding to the DC charging current and the trickle current in the previous first charging process are respectively less than periods corresponding to the DC charging current and the trickle current in the next first charging process.

14. The universal charging device according to claim 1, wherein the charger comprises:
  an input rectifier configured to receive the AC voltage and convert the AC voltage into an input direct-current (DC) voltage;
  a resonate converter coupled to the input rectifier and the power control detector, wherein the resonate converter is configured to receive the input DC voltage and convert the input DC voltage into a resonate voltage; and
  a synchronous rectifier coupled to the resonate converter and the at least one battery, wherein the synchronous rectifier is configured to receive the resonate voltage and convert the resonate voltage into the DC charging voltage, the power control detector is configured to control the resonate converter and the synchronous rectifier to adjust the DC charging voltage to be larger than the terminal voltage based on the terminal voltage, the power control detector is configured to control the resonate converter and the synchronous rectifier to generate the at least one pulse voltage in response to the DC charging voltage, the resonate converter and the synchronous rectifier are configured to respectively generate the DC charging current and the at least one pulse current based on the DC charging voltage and the at least one pulse voltage, and when the terminal voltage is equal to the DC charging voltage, the power control detector controls the resonate converter and the synchronous rectifier to convert the DC charging current into the trickle current.

15. The universal charging device according to claim 14, wherein the power control detector comprises:
  a voltage feedback circuit coupled to the synchronous rectifier and the at least one battery, wherein the voltage feedback circuit is configured to receive the terminal voltage and a voltage across the at least one battery established by the at least one pulse current, and respectively generate a first feedback voltage and at least one pulse feedback voltage based on the terminal voltage and a voltage across the at least one battery established by the at least one pulse current;
  a feedback resistor connected between the synchronous rectifier and the at least one battery in series, wherein the DC charging current, the trickle current, and the at least one pulse current flow through the feedback resistor, so as to generate a first responsive voltage, a trickle voltage, and at least one second responsive voltage across the feedback resistor;
  a current feedback circuit coupled to two ends of the feedback resistor, the synchronous rectifier, and the at least one battery, wherein the current feedback circuit is configured to receive the first responsive voltage, the trickle voltage, and the at least one second responsive voltage and respectively generate a second feedback voltage, a trickle feedback voltage, and at least one pulse responsive voltage based on the first responsive voltage, the trickle voltage, and the at least one second responsive voltage;
  an isolator having a primary side and a secondary side, wherein the secondary side is coupled to the voltage feedback circuit and the current feedback circuit; and
  a controller coupled to the primary side and the resonate converter, wherein the controller is configured to receive the first feedback voltage, the second feedback voltage, the trickle feedback voltage, the at least one pulse feedback voltage, and the at least one pulse responsive voltage through the isolator, the controller is configured to control the resonate converter and the synchronous rectifier to adjust the DC charging voltage to be larger than the terminal voltage based on the first feedback voltage, the controller is configured to control the resonate converter and the synchronous rectifier to generate the at least one pulse voltage in response to the DC charging voltage, the controller is configured to obtain the DC charging current according to the second feedback voltage, the controller is configured to obtain the DC charging voltage according to the DC charging current, the controller is configured to obtain the at least one pulse current according to the at least one pulse responsive voltage, the controller is configured to obtain the trickle current according to the trickle feedback voltage, the controller is configured to determine that the at least one pulse feedback voltage satisfies the charged condition, and when the terminal voltage is equal to the DC charging voltage, the controller controls the resonate converter and the synchronous rectifier to convert the DC charging current into the trickle current until the value of the trickle current is decreased to the triggered current value.

16. The universal charging device according to claim 1, wherein the fixed ratio is 90% or 85%.

17. The universal charging device according to claim 1, wherein an initial value of the terminal voltage divided by the rated voltage is less than or equal to 97%.

18. The universal charging device according to claim 1, wherein the at least one battery is a lithium-ion battery.

19. The universal charging device according to claim 18, wherein the lithium-ion battery is a nickel-cobalt-lithium battery, a nickel-lithium battery, or a $LiFePO_4$ battery.

20. The universal charging device according to claim 1, wherein the rated voltage has a range of 9-72 volts.

21. The universal charging device according to claim 1, wherein the at least one battery comprises 10-20 batteries connected in series.

22. The universal charging device according to claim 1, wherein before the charger and the power control detector sequentially perform the at least two first charging processes, the power control detector detects the terminal voltage and drives the charger to provide an initial voltage for the at least one battery and generate an initial current, the initial current flows through the at least one battery, and the power control detector is configured to receive the initial current and determine that the at least one battery is the battery to be charged according to the initial current, the terminal voltage, and a charging voltage range.

23. A universal charging method charging at least one battery, the at least one battery having a terminal voltage less than a rated voltage of the at least one battery, and the universal charging method comprising:
   determining that the at least one battery is a battery to be charged;
   converting an alternating-current (AC) voltage into a direct-current (DC) charging voltage; and
   sequentially performing at least two first charging processes, wherein each of the at least two first charging processes comprising steps:
      adjusting the DC charging voltage to be larger than the terminal voltage based on the terminal voltage, cooperating with the DC charging voltage to charge the at least one battery, generating at least one pulse voltage based on the DC charging voltage, respectively generating a direct-current (DC) charging current and at least one pulse current based on the DC charging voltage and the at least one pulse voltage until the terminal voltage is equal to the DC charging voltage, the DC charging current and the at least one pulse current flowing through the at least one battery, the at least one pulse current flowing through the at least one battery to establish a first detected voltage across the at least one battery, and the first detected voltage satisfying a charged condition; and
      when the terminal voltage is equal to the DC charging voltage, converting the DC charging current into a decreasing trickle current until a value of the trickle current is decreased to a triggered current value, and the triggered current value divided by a value of a corresponding the DC charging current is equal to a fixed ratio less than 1 and larger than 0.

24. The universal charging method according to claim 23, wherein the at least one pulse current has a pulse period, an initial time point, and a final time point, the at least one pulse current establishes a first open-circuit voltage across the at least one battery at the initial time point, the at least one pulse current establishes a second open-circuit voltage across the at least one battery at the final time point, and the charged condition defines that an absolute value of a difference between the first open-circuit voltage and the second open-circuit voltage divided by the pulse period is equal to or less than a given positive value.

25. The universal charging method according to claim 23, wherein the DC charging current establishes a first battery voltage across the at least one battery, the at least one pulse current establishes a second battery voltage across the at least one battery, and the charged condition defines that an absolute value of a difference between the first battery voltage and the second battery voltage divided by an absolute value of a difference between the DC charging current and the at least one pulse current is equal to or less than a given positive value.

26. The universal charging method according to claim 23, wherein after the step of performing the at least two first charging processes, performing a second charging process, and the second charging process comprises steps:
   adjusting the DC charging voltage to be larger than the terminal voltage based on the terminal voltage, cooperating with the DC charging voltage to charge the at least one battery, generating the at least one pulse voltage in response to the DC charging voltage, respectively generating the DC charging current and the at least one pulse current based on the DC charging voltage and the at least one pulse voltage, and the DC charging current and the at least one pulse current flowing through the at least one battery; and
   the at least one pulse current establishing a second detected voltage across the at least one battery, and when the second detected voltage satisfies a full condition, stopping generating the DC charging voltage, the at least one pulse voltage, the DC charging current, and the at least one pulse current.

27. The universal charging method according to claim 26, wherein the at least one pulse current has a pulse period, an initial time point, and a final time point, the at least one pulse current establishes a first open-circuit voltage across the at least one battery at the initial time point, the at least one pulse current establishes a second open-circuit voltage across the at least one battery at the final time point, and the full condition defines that an absolute value of a difference between the first open-circuit voltage and the second open-circuit voltage divided by the pulse period is larger than a given positive value.

28. The universal charging method according to claim 26, wherein the DC charging current establishes a first battery voltage across the at least one battery, the at least one pulse current establishes a second battery voltage across the at least one battery, and the full condition defines that an absolute value of a difference between the first battery voltage and the second battery voltage divided by an absolute value of a difference between the DC charging current and the at least one pulse current is larger than a given positive value.

29. The universal charging method according to claim 26, wherein the at least one pulse current comprises a plurality of pulse currents, and when the second detected voltage established by each of the plurality of pulse currents satisfies the full condition, the DC charging voltage stops being generated.

30. The universal charging method according to claim 23, wherein in each of the at least two first charging processes, a period that the terminal voltage is equal to the DC charging voltage is less than a period that the DC charging voltage is larger than the terminal voltage.

31. The universal charging method according to claim 23, wherein the at least two first charging processes comprise a previous first charging process and a next first charging process, and periods corresponding to the DC charging current and the trickle current in the previous first charging process are respectively larger than periods corresponding to the DC charging current and the trickle current in the next first charging process.

32. The universal charging method according to claim 23, wherein a pulse period of the at least one pulse current is less than a period of a corresponding the DC charging current.

33. The universal charging method according to claim 23, wherein in the step of adjusting the DC charging voltage to be larger than the terminal voltage, a difference between the DC charging voltage and a corresponding the terminal voltage is a given value, and the given values corresponding to the at least two first charging processes are equal.

34. The universal charging method according to claim 23, wherein the at least two first charging processes comprise a previous first charging process and a next first charging process, in the step of adjusting the DC charging voltage to be larger than the terminal voltage, a difference between the DC charging voltage and a corresponding the terminal voltage is a given value, and the given value corresponding to the previous first charging process is larger than the given value corresponding to the next first charging process.

35. The universal charging method according to claim 23, wherein the at least two first charging processes comprise a previous first charging process and a next first charging process, periods of the DC charging current and the trickle current corresponding to the previous first charging process are respectively less than periods of the DC charging current and the trickle current corresponding to the next first charging process.

36. The universal charging method according to claim 23, wherein the fixed ratio is 90% or 85%.

37. The universal charging method according to claim 23, wherein an initial value of the terminal voltage divided by the rated voltage is less than or equal to 97%.

38. The universal charging method according to claim 23, wherein in the step of determining that the at least one battery is the battery to be charged, the terminal voltage is detected, an initial voltage is provided to the at least one battery to generate an initial current that flows through the at least one battery, and the at least one battery is determined as the battery to be charged according to the initial current, the terminal voltage, and a charging voltage range.

* * * * *